(12) United States Patent
Hall (10) Patent No.: US 11,685,277 B1
(45) Date of Patent: Jun. 27, 2023

(54) ELECTRIC VEHICLE CHARGER FOR AN ELECTRIC VEHICLE AND A METHOD OF USE

(71) Applicant: BETA AIR, LLC, South Burlington, VT (US)

(72) Inventor: Edward Hall, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/890,759

(22) Filed: Aug. 18, 2022

(51) Int. Cl.
| | |
|---|---|
| *B60L 53/30* | (2019.01) |
| *B60L 53/18* | (2019.01) |
| *H02G 11/02* | (2006.01) |
| *B60L 53/16* | (2019.01) |

(52) U.S. Cl.
CPC ............. *B60L 53/30* (2019.02); *B60L 53/18* (2019.02); *H02G 11/02* (2013.01); *B60L 53/16* (2019.02); *B60L 2200/10* (2013.01)

(58) Field of Classification Search
CPC ....................................................... B60L 53/30
USPC .......................................................... 320/109
See application file for complete search history.

(56) References Cited

U.S. PATENT DOCUMENTS

| | | | | |
|---|---|---|---|---|
| 5,299,670 | A  * | 4/1994 | Willard ................... | H04M 1/15 379/438 |
| 2005/0284980 | A1* | 12/2005 | Chang .................... | H01R 13/72 242/400.1 |
| 2014/0305759 | A1* | 10/2014 | Zuber ..................... | B60L 53/18 191/12.2 R |
| 2015/0008878 | A1* | 1/2015 | Mizuno .............. | B65H 75/4415 320/109 |
| 2016/0121747 | A1* | 5/2016 | Jefferies ................. | B60L 53/16 320/109 |
| 2022/0166203 | A1* | 5/2022 | Theiß ................. | B65H 75/4407 |

* cited by examiner

*Primary Examiner* — Jerry D Robbins
(74) *Attorney, Agent, or Firm* — Caldwell Intellectual Property Law (57) ABSTRACT

Electric vehicle charger for an electric vehicle and a method of use is presented in this disclosure. The charger includes a charging cable, a charging connector including an actuator, a cable reel, and a idler drum. The cable reel includes a helical pattern where the charging cable resides during the stowed configuration. The idler drum is parallel to the cable reel.

18 Claims, 7 Drawing Sheets

ELECTRIC VEHICLE CHARGER FOR AN ELECTRIC VEHICLE AND A METHOD OF USE

FIELD OF THE INVENTION

The present invention generally relates to the field of charging systems. In particular, the present invention is directed to an electric vehicle charger for an electric vehicle and a method of use.

BACKGROUND

When charging an electric aircraft, easy to use charging systems are important. Messy cable solutions may cause frustration and lost time, decreasing the appeal of electric aircraft. Furthermore, having to manually pay in or out the charging cable from a charging system wastes time and creates additional hassle. Additionally, the charging cable is very heavy and paying out the cable manually is cumbersome. Existing solutions are not satisfactory.

SUMMARY OF THE DISCLOSURE

In an aspect, an electric vehicle charger for an electric vehicle includes a charging cable, a charging connector mechanically connected to the charging cable, the charging connector comprising: a rotation mechanism configured to control a pay in and a pay out function of the electric vehicle charger, a cable reel comprising a helical pattern and configured to stow the charging cable, and an idler drum parallel to the cable reel.

In another aspect, a method of use for an electric vehicle charger with a reel button for an electric vehicle including activating, by a rotation mechanism of a charging connector, a pay in and a pay out function of a cable reel, paying out, by the cable reel and an idler drum, the charging cable wherein the cable reel comprises a helical pattern, and connecting, by the charging connector, the charging cable to the electric vehicle.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems for charging an electric aircraft. Aspect of the present disclosure include a reel around which a charging cable can be wrapped. The charging cable can be unwound from the reel by a rotation mechanism and an idler drum configured to provide a resultant force.

Aspects of the present disclosure includes a helical pattern where the charging cable may reside during a stowed configuration. Helical pattern may be used to assist in cooling of the charging cable by way of conduction and convection.

Aspects of the present disclosure allow for a controller to control rotation mechanism, locking mechanism, and/or opening mechanism. In some embodiments, controller may control these components in response to various actuators that may be operated by the user. This allows for convenient operation of the electric aircraft charging system.

Figure 1:
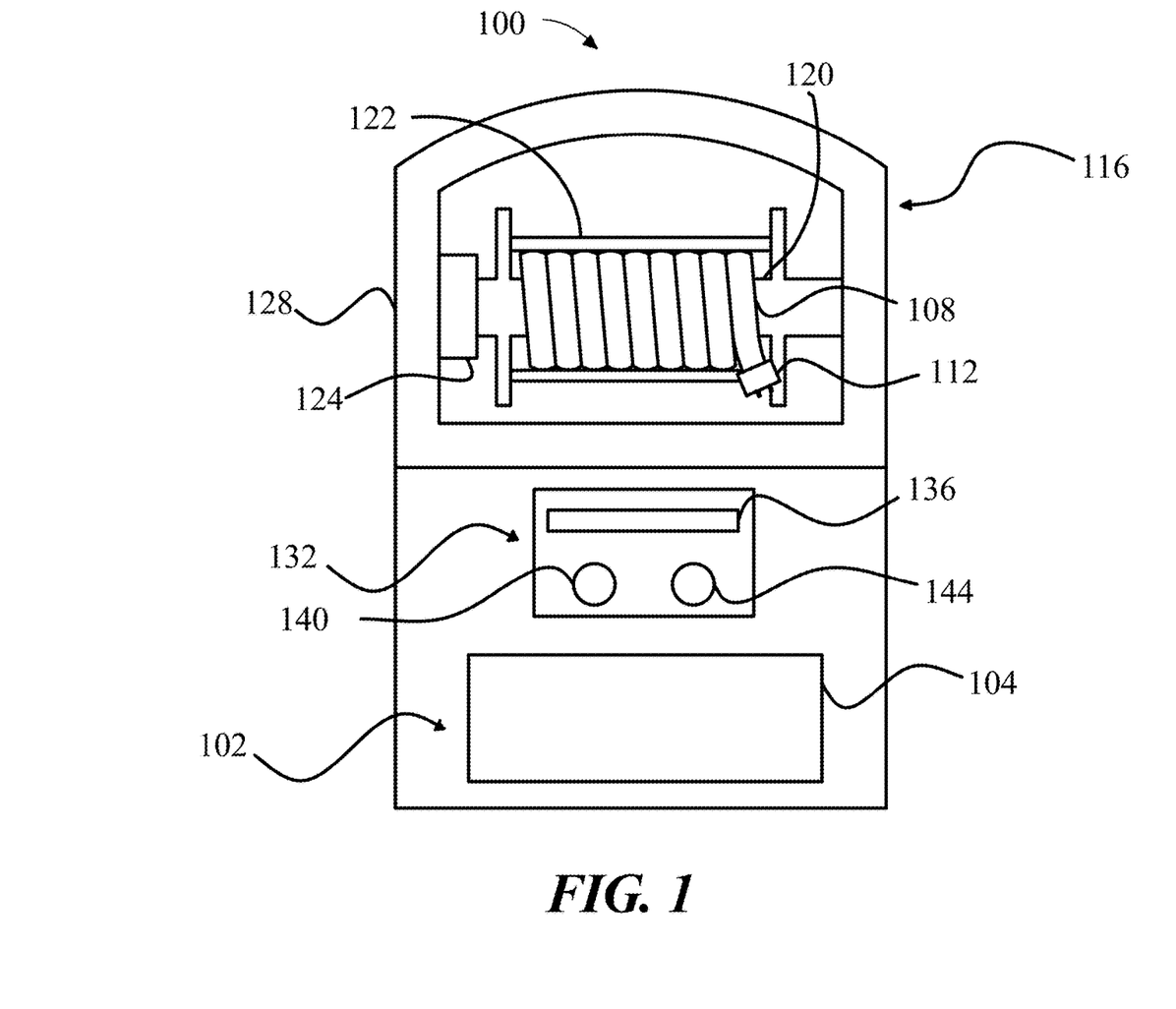
FIG. 1 is a diagram of an exemplary electric aircraft charging system.

Referring now to FIG. 1, an embodiment of an electric aircraft charging system 100 is shown. System may include a charger base 102. A "charger base," for the purposes of this disclosure, is a portion of a charging system that is in contact with the ground. In some embodiments, charger base 102 may be fixed to another structure. As a non-limiting example, charger base 102 may be fixed to a helipad. As another non-limiting example, charger base 102 may be fixed to the ground. As another non-limiting example, charger base 102 may be fixed to a cart, wherein the cart may have wheels. One of ordinary skill in the art would appreciate, after having reviewed the entirety of this disclosure, that charger base 102 may fixed to a variety of structures or objects depending on the location and/or support requirements of system 100. Charger base 102 may be located on or proximal to a helideck or on or near the ground. In this disclosure, a "helideck" is a purpose-built helicopter landing area located near charger base 102 and may be in electric communication with it. Helideck may be elevated or at ground level. Helideck may be made from any suitable material and may be any dimension. Helideck may include a designated area for the electric vehicle to land and takeoff on. Alternatively, charger base 102 may be located on a vehicle, such as a cart or a truck, thereby allowing charger base 102 to be mobile and moved to an electric vehicle.

Charger base 102 may include an energy source 104. An "energy source," for the purposes of this disclosure, is a source of electrical power. In some embodiments, energy source 104 may be an energy storage device, such as, for example, a battery or a plurality of batteries. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, energy source 104 need not be made up of only a single electrochemical cell, it can consist of several electrochemical cells wired in series or in parallel. In other embodiments, energy source 104 may be a connection to the power grid. For example, in some non-limiting embodiments, energy source 104 may include a connection to a grid power component. Grid power component may be connected to an external electrical power grid. In some other embodiments, the external power grid may be used to charge batteries, for example, when energy source 104 includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Some components of system 100 may be consistent with the charger disclosed in U.S. application Ser. No. 17/477,987 filed on Sep. 17, 2021, titled "Systems and Methods for Adaptive Electric aircraft," the entirety of which is hereby incorporated by reference. Additionally, some components of system 100 may be consistent with the charger disclosed in U.S. application Ser. No. 17/515,448 filed on Oct. 31, 2021, titled "Systems and Methods for an Immediate Shutdown of an Electric aircraft Charger," the entirety of which is hereby incorporated by reference.

With continued reference to FIG. 1, system 100 may include a charging cable 108. A "charging cable," for the purposes of this disclosure is a conductor or conductors adapted to carry power for the purpose of charging an electronic device. Charging cable 108 is configured to carry electricity. Charging cable 108 is electrically connected to the energy source 104. "Electrically connected," for the purposes of this disclosure, means a connection such that electricity can be transferred over the connection. In some embodiments, charging cable 108 may carry AC and/or DC power to a charging connector 112. The charging cable may include a coating, wherein the coating surrounds the conductor or conductors of charging cable 108. One of ordinary skill in the art, after having reviewed the entirety of this disclosure, would appreciate that a variety of coatings are suitable for use in charging cable 108. As a non-limiting example, the coating of charging cable 108 may comprise rubber. As another non-limiting example, the coating of charging cable 108 may comprise nylon. Charging cable 108 may be a variety of lengths depending on the length required by the specific implementation. As a non-limiting example, charging cable 108 may be 10 feet. As another non-limiting example, charging cable 108 may be 25 feet. As yet another non-limiting example, charging cable 108 may be 50 feet.

With continued reference to FIG. 1, system 100 may include a charging connector 112. Charging cable 108 may be electrically connected to charging connector 112. Charging connector 112 may be disposed at one end of charging cable 108. Charging connector 112 may be configured to couple with a corresponding charging port on an electric aircraft. For the purposes of this disclosure, a "charging connector" is a device adapted to electrically connect a device to be charged with an energy source. For the purposes of this disclosure, a "charging port" is a section on a device to be charged, arranged to receive a charging connector.

With continued reference to FIG. 1, charging connector 112 may include a variety of pins adapted to mate with a charging port disposed on an electric aircraft. An "electric aircraft," for the purposes of this disclosure, refers to a machine that is able to fly by gaining support from the air generates substantially all of its trust from electricity. As a non-limiting example, electric aircraft maybe capable of vertical takeoff and landing (VTOL) or conventional takeoff and landing (CTOL). As another non-limiting example, the electric aircraft may be capable of both VTOL and CTOL. As a non-limiting example, electric aircraft may be capable of edgewise flight. As a non-limiting example, electric aircraft may be able to hover. Electric aircraft may include a variety of electric propulsion devices; including, as non-limiting examples, pushers, pullers, lift devices, and the like. The variety of pins included on charging connector 112 may include, as non-limiting examples, a set of pins chosen from an alternating current (AC) pin, a direct current (DC) pin, a ground pin, a communication pin, a sensor pin, a proximity pin, and the like. In some embodiments, charging connector 112 may include more than one of one of the types of pins mentioned above.

With continued reference to FIG. 1, for the purposes of this disclosure, a "pin" may be any type of electrical connector. An electrical connector is a device used to join electrical conductors to create a circuit. As a non-limiting example, in some embodiments, any pin of charging connector 112 may be the male component of a pin and socket connector. In other embodiments, any pin of charging connector 112 may be the female component of a pin and socket connector. As a further example of an embodiment, a pin may have a keying component. A keying component is a part of an electrical connector that prevents the electrical connector components from mating in an incorrect orientation. As a non-limiting example, this can be accomplished by making the male and female components of an electrical connector asymmetrical. Additionally, in some embodiments, a pin, or multiple pins, of charging connector 112 may include a locking mechanism. For instance, as a non-limiting example, any pin of charging connector 112 may include a locking mechanism to lock the pins in place. The pin or pins of charging connector 112 may each be any type of the various types of electrical connectors disclosed above, or they could all be the same type of electrical connector. One of ordinary skill in the art, after reviewing the entirety of this disclosure, would understand that a wide variety of electrical connectors may be suitable for this application.

With continued reference to FIG. 1, in some embodiments, charging connector 112 may include a DC pin. DC pin supplies DC power. "DC power," for the purposes of this disclosure refers, to a one-directional flow of charge. For example, in some embodiments, DC pin may supply power with a constant current and voltage. As another example, in other embodiments, DC pin may supply power with varying current and voltage, or varying currant constant voltage, or constant currant varying voltage. In another embodiment, when charging connector is charging certain types of batteries, DC pin may support a varied charge pattern. This involves varying the voltage or currant supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like.

With continued reference to FIG. 1, in some embodiments, charging connector may include an AC pin. An AC pin supplies AC power. For the purposes of this disclosure, "AC power" refers to electrical power provided with a bi-directional flow of charge, where the flow of charge is periodically reversed. AC pin may supply AC power at a variety of frequencies. For example, in a non-limiting embodiment, AC pin may supply AC power with a frequency of 50 Hz. In another non-limiting embodiment, AC pin may supply AC power with a frequency of 60 Hz. One of ordinary skill in the art, upon reviewing the entirety of this disclosure, would realize that AC pin may supply a wide variety of frequencies. AC power produces a waveform when it is plotted out on a current vs. time or voltage vs. time graph. In some embodiments, the waveform of the AC power supplied by AC pin may be a sine wave. In other embodiments, the waveform of the AC power supplied by AC pin may be a square wave. In some embodiments, the waveform of the AC power supplied by AC pin may be a triangle wave. In yet other embodiments, the waveform of the AC power supplied by AC pin may be a sawtooth wave. The AC power supplied by AC pin may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 1, in some embodiments, charging connector 112 may include a ground pin. A ground pin is an electronic connector that is connected to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 1, in some embodiments, charging connector 112 may include a communication pin. A communication pin is an electric connector configured to carry electric signals between components of charging system 100 and components of an electric aircraft. As a non-limiting example, communication pin may carry signals from a controller in a charging system (e.g. controller 204 disclosed with reference to FIG. 2) to a controller onboard an electric aircraft such as a flight controller or battery management controller. A person of ordinary skill in the art would recognize, after having reviewed the entirety of this disclosure, that communication pin could be used to carry a variety of signals between components.

With continued reference to FIG. 1, charging connector 112 may include a variety of additional pins. As a non-limiting example, charging connector 112 may include a proximity detection pin. Proximity detection pin has no current flowing through it when charging connector 112 is not connected to a port. Once charging connector 112 is connected to a port, then proximity detection pin will have current flowing through it, allowing for the controller to detect, using this current flow, that the charging connector 112 is connected to a port.

Figure 3A:
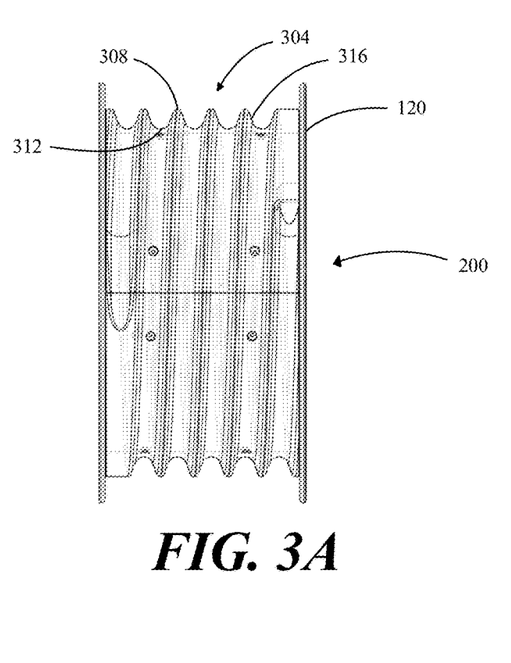
FIGS. 3A and B are diagrams of an exemplary embodiments of a cable reel.

With continued reference to FIG. 1, system 100 include a cable reel module 116. The cable reel module 116 includes a cable reel 120 (also referred to as "reel"). For the purposes of this disclosure, "a cable reel module" is the portion of a charging system containing a reel, that houses a charging cable when the charging cable is stowed. For the purposes of this disclosure, a "reel" is a rotary device around which an object may be wrapped. Reel 120 is rotatably mounted to cable reel module 116. For the purposes of this disclosure, "rotatably mounted" means mounted such that the mounted object may rotate with respect to the object that the mounted object is mounted on. Reel 120 may be cylindrical shaped. Reel 120 may be positioned horizontally, as shown in FIG. 1 and FIGS. 3A and B. Additionally, when the charging cable 108 is in a stowed configuration, the charging cable is wound around reel 120. As a non-limiting example, charging cable 108 is in the stowed configuration in FIG. 1. In the stowed configuration, charging cable 108 need not be completely wound around reel 120. As a non-limiting example, a portion of charging cable 108 may hang free from reel 120 even when charging cable 108 is in the stowed configuration. In the stowed configuration, charging cable 108 may be coiled in a single layer around reel 120. Reel 120 includes a helical pattern for charging cable 108 to coil around. Helical pattern may be presented as groves and ridges on a surface of reel 120. Helical pattern may be described in further detail in FIG. 3.

Continuing to reference FIG. 1, cable reel module 116 includes an idler drum 122. An "idler drum", as used herein, is a freely rotating part. Idler drum 122 may be hollow or filled. An idler drum 122 is parallel to cable reel 120. In an embodiment, idler drum 122 may be placed above or below cable reel 120 such that the stowed charging cable 108 is in between the cable reel 120 and the idler drum 122. System 100 may include one or more idler drums. For example, there may be one idler drum above cable reel 120 and one idler drum below cable reel 120. Idler drum 122 may apply a pressure to charging cable 108 to hold charging cable 108 to the helical groves on reel 120. Idler drum 122 may provide a resultant force during a pay out of charging cable 108. This is due to the idler drum 122 being free spinning. For the purposes of this disclosure, "free spinning" means able to rotate with little to no resistance. "Pay out", as used herein, is the act of extending or drawing out. For example, paying out charging cable 108 means releasing charging cable 108 from cable reel 120 to bring it closer to an aircraft/device to be charged. In some embodiments, when paying out charging cable 108, cable reel 120 may be rotating in a reverse direction, discussed further below. In an embodiment where a reverse direction is counterclockwise, idler drum 122 may be rotating clockwise, or vice versa. The motion of the cable reel 120 moving counterclockwise causes an opposite rotation on the idler drum 122. The opposing rotations may allow charging cable 108 to be pushed from cable reel 120. Without idler drum 122, the rotation of cable reel 120 alone may not push charging cable 120 out of cable reel 120 without assistance from a person, robot, or the like that may provide a pulling force, pulling charging cable 108 from cable reel 120. The addition of an idler drum 122 allows for ease of charging, as charging cable 108 may be heavy and cumbersome to manually pull.

With continued reference to FIG. 1, cable reel module 116 includes a rotation mechanism 124. A "rotation mechanism," for the purposes of this disclosure is a mechanism that is configured to cause another object to undergo rotary motion. As a non-limiting example, rotation mechanism may include a rotary actuator. An actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control. As a non-limiting example, rotation mechanism 124 may include an electric motor. As another non-limiting example, rotation mechanism 124 may include a servomotor. As yet another non-limiting example, rotation mechanism 124 may include a stepper motor. In some embodiments, rotation mechanism 124 may include a compliant element. For the purposes of this disclosure, a "compliant element" is an element that creates force through elastic deformation. As a non-limiting example, rotation mechanism 124 may include a torsional spring, wherein the torsional spring may elastically deform when reel 120 is rotated in, for example, the forward direction; this would cause the torsional spring to exert torque on reel 120, causing reel 120 to rotate in a reverse direction when it has been released. Rotation mechanism 124 is configured to rotate reel 120 in a reverse direction. In some embodiments, rotation mechanism 124 may be configured to rotate reel 120 in a forward direction. Forward direction and reverse direction are opposite directions of rotation. As a non-limiting example, the forward direction may be clockwise, whereas the reverse direction may be counterclockwise, or vice versa. As a non-limiting example, rotating in the forward direction may cause charging cable 108 to extend, whereas rotating in the reverse direction may cause charging cable 108 to stow, or vice versa. In some embodiments, rotation mechanism 124 may continually rotate reel 120 when rotation mechanism 124 is enabled. In some embodiments, rotation mechanism 124 may be configured to rotate reel 120 by a specific number of degrees. In some embodiments, rotation mechanism 124 may be configured to output a specific torque to reel 120. As a non-limiting example, this may be the case, wherein rotation mechanism 124 is a torque motor. Rotation mechanism 124 may be electrically connected to energy source 104.

With continued reference to FIG. 1, cable reel module 116 may include an outer case 128. Outer case 128 may enclose reel 120, idler drum 122, and rotation mechanism 124. In some embodiments, outer case 128 may enclose charging cable 108 and possibly charging connector 112 when the charging cable 108 is in its stowed configuration.

With continued reference to FIG. 1, system 100 may include a control panel 132. For the purposes of this disclosure, a "control panel" is a panel containing a set of controls for a device. Control panel 132 may include a display 136, a reel toggle 140, and a reel locking toggle 144. For the purposes of this disclosure, a "display" is an electronic device for the visual presentation of information. Display 136 may be any type of screen. As non-limiting examples, display 136 may be an LED screen, an LCD screen, an OLED screen, a CRT screen, a DLPT screen, a plasma screen, a cold cathode display, a heated cathode display, a nixie tube display, and the like. Display 136 may be configured to display any relevant information. A person of ordinary skill in the art would appreciate, after having reviewed the entirety of this disclosure, that a variety of information could be displayed on display 136. In some embodiments, display 136 may display metrics associated with the charging of an electric aircraft. As a non-limiting example, this may include energy transferred. As another non-limiting example, this may include charge time remaining. As another non-limiting example, this may include charge time elapsed.

With continued reference to FIG. 1, reel toggle 140 may be configured to send a first toggle signal to a controller, wherein the first toggle signal may cause the controller to send a retraction signal. A "toggle" for the purposes of this disclosure, is a device or signal, configured to change a mechanism or device between at least two states. A "reel toggle," for the purposes of this disclosure, is a toggle that changes or alters, directly or indirectly, the rotation of a reel. Reel toggle 140, the controller, and the retraction signal are further discussed with reference to FIG. 2. In some embodiments, reel toggle 140 may be a button, wherein pressing the button causes reel toggle 140 to send the first toggle signal. In some embodiments, reel toggle 140 may be configured to send a second toggle signal to the controller, wherein the second signal causes the controller to send an extension signal. Second toggle signal and extension signal are discussed further with reference to FIG. 2. In some embodiments, reel toggle may be disposed on outer case 128 of cable reel module 116. In some embodiments, reel toggle may be disposed on charging connector 112.

With continued reference to FIG. 1, reel locking toggle 144 may be configured to send a reel locking toggle signal to a controller, wherein receiving the reel locking toggle signal may cause the controller to send an unlocking signal to a locking mechanism. A "reel locking toggle," for the purposes of this disclosure, is a toggle that changes or alters, directly or indirectly, the state of a locking mechanism. A "reel locking toggle signal," for the purposes of this disclosure, is a signal send by a reel locking toggle, wherein the reel locking toggle signal causes, directly or indirectly, a change or altercation of a locking mechanism. Receiving the unlocking signal may cause the locking mechanism to enter its disengaged state. Reel locking toggle 144, reel locking toggle signal, controller, and unlocking signal are discussed further with reference to FIG. 1. The locking mechanism is discussed further with reference to FIG. 3. In some embodiments, reel locking toggle may be disposed on outer case 128 of cable reel module 116. In some embodiments, reel locking toggle may be disposed on charging connector 112.

With continued reference to FIG. 1, a variety of devices may be used for reel toggle 140 and/or reel locking toggle 144. Reel toggle 140 and/or reel locking toggle 144 may be a button or the like mounted to a surface of charging connector 112. As non-limiting examples, the button may be a mechanical button, a resistive button, a capacitive button, and the like. As another nonlimiting example, the button may be a virtual button on a touchscreen. In some embodiments, reel toggle 140 and/or reel locking toggle 144 may each include a dial. The dial may include any number of positions, or it may be a continuous dial. In some embodiments, the dial may have 2 positions, wherein one position may be disengaged, and the second position may be engaged, and thus cause a toggle signal to be sent to the controller. In some embodiments, the dial may include an additional third position, wherein the second position causes the first toggle signal to be sent and the second position causes the second toggle signal to be sent. In some embodiments, reel toggle 140 and/or reel locking toggle 144 may each include a rocker switch. In some embodiments, the rocker switch may have 2 positions, wherein one position may be disengaged, and the second position may be engaged, and thus cause a toggle signal to be sent to the controller. In some embodiments, the rocker switch may include an additional third position, wherein the second position causes the first toggle signal to be sent and the second position causes the second toggle signal to be sent. One of ordinary skill in the art would appreciate, after having reviewed the entirety of this disclosure, that a variety of possible devices may be suitable for use as reel toggle 140 and/or reel locking toggle 144.

Additional disclosures on charging with a cable reel may be found in U.S. patent application Ser. No. 17/736,530, filed on May 4, 2022, and entitled "SYSTEM FOR AN ELECTRIC AIRCRAFT CHARGING WITH A CABLE REEL", which is incorporated in its entirety herein.

Figure 2:
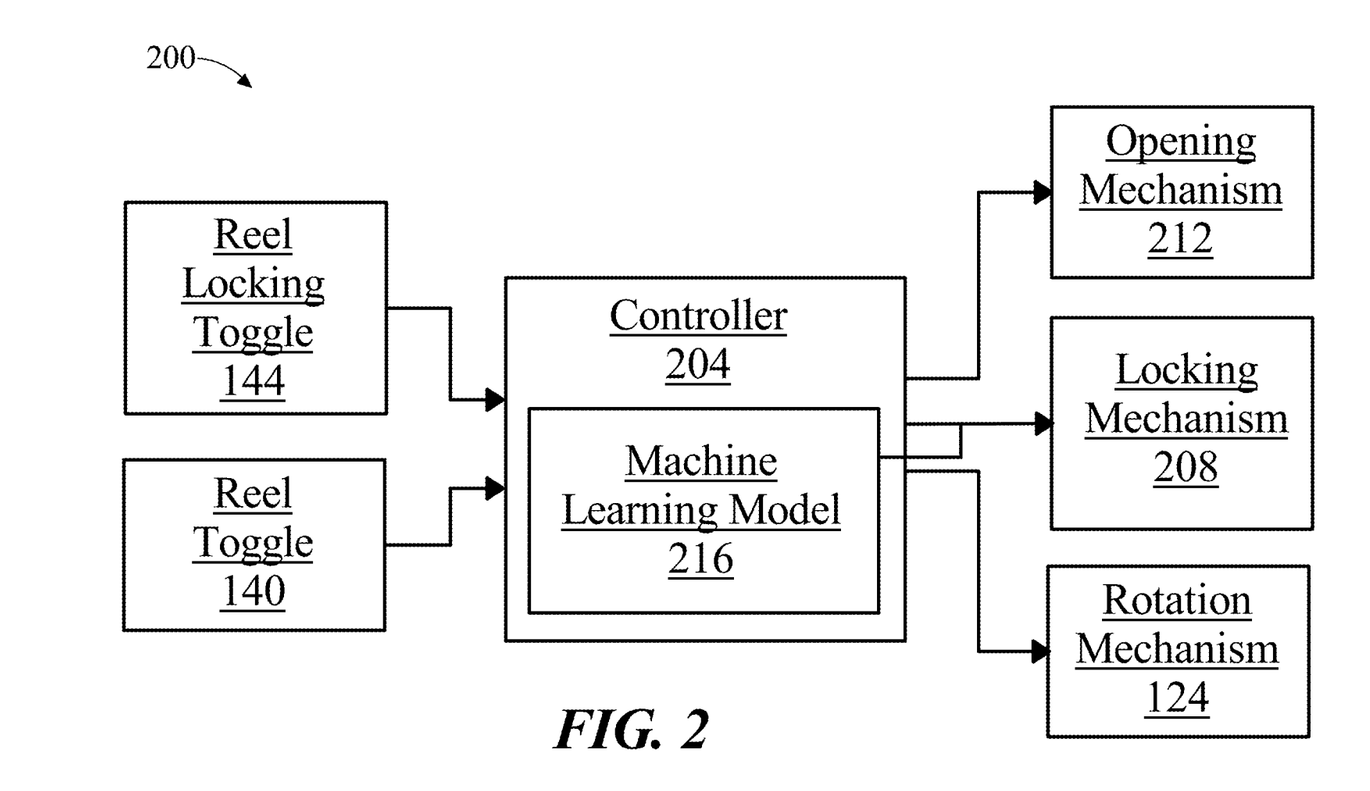
FIG. 2 is a block diagram of an exemplary control system for an electric aircraft charging system.

Referring now to FIG. 2, an exemplary embodiment of control system 200 for an electric vehicle charger is shown. System 200 may include a controller 204. Controller 204 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 204 may include a single computing device operating independently, or may include two or more computing device operating in concert, in parallel, sequentially or the like; two or more computing devices may be included together in a single computing device or in two or more computing devices. Controller 204 may interface or communicate with one or more additional devices as described below in further detail via a network interface device. Network interface device may be utilized for connecting controller 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 204 may include but is not limited to, for example, a computing device or cluster of computing devices in a first location and a second computing device or cluster of computing devices in a second location. controller 204 may include one or more computing devices dedicated to data storage, security, distribution of traffic for load balancing, and the like. Controller 204 may distribute one or more computing tasks as described below across a plurality of computing devices of computing device, which may operate in parallel, in series, redundantly, or in any other manner used for distribution of tasks or memory between computing devices. Controller 204 may be implemented using a "shared nothing" architecture in which data is cached at the worker, in an embodiment, this may enable scalability of system 100 and/or computing device.

With continued reference to FIG. 2, controller 204 may be designed and/or configured to perform any method, method step, or sequence of method steps in any embodiment described in this disclosure, in any order and with any degree of repetition. For instance, controller 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 2, controller 204 is communicatively connected to rotation mechanism 124. Controller 204 may be communicatively connected to a locking mechanism 208. Controller 204 may be communicatively connected to an opening mechanism 212. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Controller 204 may be configured to send an extension signal to rotation mechanism 124. The extension signal may cause rotation mechanism 124 rotate reel 120 in a forward direction. Controller 204 is also configured to send a retraction signal to rotation mechanism 124. The retraction signal causes rotation mechanism 124 to rotate reel 120 in a reverse direction. Forward direction and reverse direction may be consistent with any forward direction and reverse direction, respectively, disclosed as part of this disclosure. In some embodiments, controller 204 may be further configured to send a locking signal to the locking mechanism 208, wherein the locking signal causes the locking mechanism to enter its engaged state. In some embodiments, controller 204 may be further configured to controller to send an unlocking signal to locking mechanism 208.

With continued reference to FIG. 2, system 200 may further include a reel toggle 140. Reel toggle 140 may be communicatively connected to controller 204. Reel toggle 140 may be configured to send a first toggle signal to controller 204. The first toggle signal may cause controller 204 to send the retraction signal. In some embodiments, reel toggle 140 may be configured to send a first toggle signal to controller 204 for as long as reel toggle 140 is pressed or otherwise engaged. Furthermore, controller 204 may be configured to send the retraction signal to rotation mechanism 124 so long as controller 204 is receiving the first toggle signal. In this way, a user may control when rotation mechanism 124 retracts charging cable 108 be engaging and disengaging reel toggle 140. In other embodiments, engaging reel toggle once, for any amount of time, may be sufficient to fully stow charging cable 108. In some embodiments, reel toggle 140 may be configured to send a second toggle signal to controller 204. Second toggle signal may cause controller 204 to send an extension signal. Extension signal may be sent by controller 204 to rotation mechanism 124. In some embodiments, reel toggle 140 may be configured to send a second toggle signal to controller 204 for as long as reel toggle 140 is pressed or otherwise engaged. Furthermore, controller 204 may be configured to send the extension signal to rotation mechanism 124 so long as controller 204 is receiving the second toggle signal. In this way, a user may control when rotation mechanism 124 extends charging cable 108 be engaging and disengaging reel toggle 140. In some embodiments, pushing or otherwise engaging reel toggle 140 may cause reel toggle 140 to send either first reel toggle signal or second toggle signal, depending on the last signal that was send by reel toggle 140. As a non-limiting example, if reel toggle 140 is pressed or otherwise engaged a first time, it may send a first toggle signal and if reel toggle 140 is pressed or otherwise engaged a second time, reel toggle 140 may send a second toggle signal. In some embodiments, if reel toggle 140 is pushed or otherwise engaged a third time, reel toggle 140 may send the first toggle signal.

With continued reference to FIG. 2, system 200 may further include a reel locking toggle 144. Reel locking toggle 144 may be communicatively connected to controller 204. Reel locking toggle 144 may be configured to send a reel locking toggle signal to controller 204. The reel locking toggle signal may cause controller 204 to send the unlocking signal.

With continued reference to FIG. 2, controller 204 may include a machine-learning model 216. Machine-learning module 216 may be used to control rotation mechanism 124 based on various charging parameters. In an embodiment, rotation mechanism 124 may rotate in a forward or reverse direction based on whether charging cable 108 is retracted or extended. Machine-learning model 216 may be used determine a position of rotation mechanism 124 to rotate to. Machine-learning model 216 may also be used to determine a speed, acceleration, or the like of rotation mechanism 124. Machine-learning model 216 may be trained with training data correlating charging parameters to charging cable positions, charging parameters to rotational speeds of reel 120, and the like. Training data may include testing data from experimentation of rotational speeds, charging cable positions, and the like. Charging parameters may include time of day, proximity of electric vehicle to charging cable, idle time, and the like. Machine-learning model 216 may be used to activate rotation mechanism 124 without user intervention, wherein a user may be a pilot, technician, or the like. Training data may include previous inputs and outputs from machine-learning model 216, such that machine-learning model 216 is iterative. Machine-learning model 216 may be consistent with any machine-learning model as discussed herein. Machine-learning model 216 may be generated using a machine-learning module as discussed with reference to FIG. 6.

Referring now to FIG. 3A, an exemplary embodiment 300 of a cable reel 120. In an embodiment, a surface of reel 120 may have ridges in a helical pattern 304. Helical pattern 304 may be screw-like, such that there may be threads on reel 120. As used herein, a "thread" is a ridge of uniform section in the form of a helix. A thread may have characteristics, such as a crest 308, a root 312, a thread pitch, flank angle 316, and the like, much like a thread of a screw. A "crest" is the top part of a ridge of a thread. A "root" is the valley of a ridge of a thread. A "thread pitch" is a distance between threads, such as a distance between root to root. A "flank angle" is the angle of the side connecting the crest and the root. Charging cable 108 may rest in between crests 308 in helical pattern 304, such as in a root 312 of helical pattern 304. Flank angle 316 may be configured to assist in coiling around helical pattern 304. For example, flank angle 316 may be curved to match the profile of charging cable 108. Charging cable 108 may be wrapped around reel 120 such that no part of the charging cable 108 is touching other parts of the charging cable 108. In other words, charging cable 108 may be wrapped in a single layer of coils around reel 120 in helical pattern 304. Because of this, length of total threads in helical pattern 304 may be greater than or equal to length of charging cable 108. In an embodiment, total thread length may be calculated as a length of charging cable 108 per one coil of helical pattern 304. This number may then be multiplied by the total number of coils needed to coil the charging cable 108 around reel 120. Length of reel 120 may be calculated as a function of the total thread length. The number of coils needed on helical pattern 304 may be calculated as a function of the diameter of reel 120 and length of charging cable 108. A pitch of helical pattern 304 may be no less than a diameter of charging cable 108. In an embodiment, a pitch of helical pattern 304 may be greater than the diameter of charging cable 108. For example, the length of crest 308 may be ½" while the diameter of charging cable 108 may be ⅝". In this example, the pitch of helical pattern 304 is 1⅛", which is greater than ⅝".

Continuing to reference FIG. 3A, helical pattern 304 dimensions may be determined as a function of heat distribution. Helical pattern 304 may be advantageous for cooling of the charging cable 108. Because charging cable 108 does not lie on top of itself when stowed, due to helical pattern 304, charging cable 108 may not heat itself up due to conduction and/or convection. Each coil of charging cable 108 may be resting between crests 308 of helical pattern 304. This may assist in heat dissipation as the coils are not touching each other. Pitch of helical pattern 304 and crest 308 length may be selected based on desired heat distribution to ensure adequate cooling of charging cable 108. Additionally, height of crest 308, which is the vertical distance between the root 312 and the crest 308, may be raised to assist with heat dissipation. The height of crest 308 may be taller than the diameter of charging cable 108. In an embodiment, the crest 308 may act as cooling fins, much like fins in a heat sink, to dissipate heat from the charging cable 108. In an embodiment, crest 308 may be a length greater than the diameter of the charging cable 108. This may act as cooling fins, as a greater length means more surface area for heat to dissipate from. For example, heat may dissipate from the charging cable 108 to the reel 120 by way of conduction. Then, heat may dissipate from the reel 120 from the crest 308 (which acts as cooling fins) by way of convection. The cross-sectional shape from the crest 308 to the root may be triangular, rectangular, or the like. The cross-sectional shape may include curved edges and the like. In some embodiments, the portion of crest 308 that rises above charging cable 108 may be fin shaped. Additionally, reel 120 may be composed of a material with a high thermal conductivity coefficient, such as a material with a thermal conductivity greater than 230 W/mK at 20° C. and 1 bar. For example, reel 120 may be composed of aluminum, copper, or the like. A high thermal conductivity for reel 120 may be important, as it may allow for greater heat transfer from charging cable 108 to reel 120, which would allow for greater heat dissipation, and greater cooling. Cable reel 120 may transfer heat from the charging cable 108 to an external environment, such as the ambient environment. This may be done using conduction to remove heat from the charging cable 108 and convection to remove heat from the helical pattern 304 of the cable reel 120.

Figure 3B:
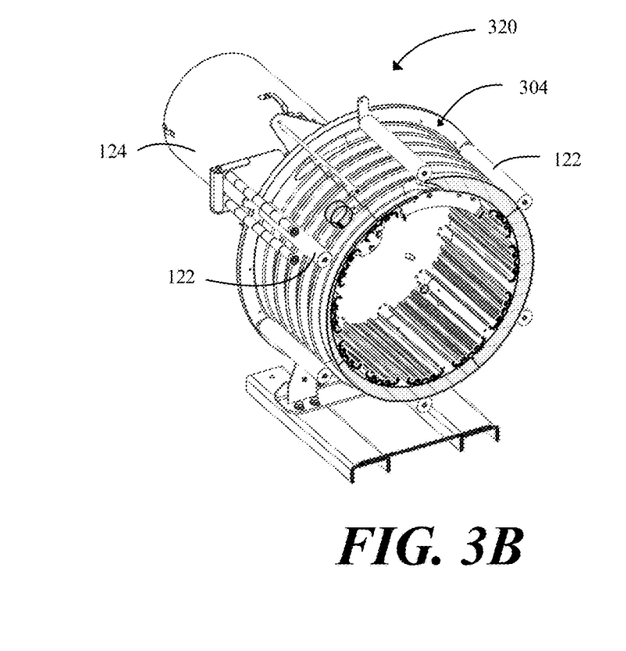

Now referring to FIG. 3B, an exemplary embodiment of an isometric view 320 of a cable reel. Isometric view 320 may show a plurality of idler drums 122 parallel to the cable reel 120. Cable reel 120 may be mechanically connected to a rotation mechanism 124. In an embodiment, cable reel 120 may be mechanically connected to an electric motor. As used herein, "mechanically connected" refers to one or more components that are connected, directly or indirectly, by mechanical fasteners. Mechanical fasteners may include bolts, rivets, screws, or the like. Cable reel 120 includes a helical pattern 304, wherein the cable connector may reside.

Figure 4:
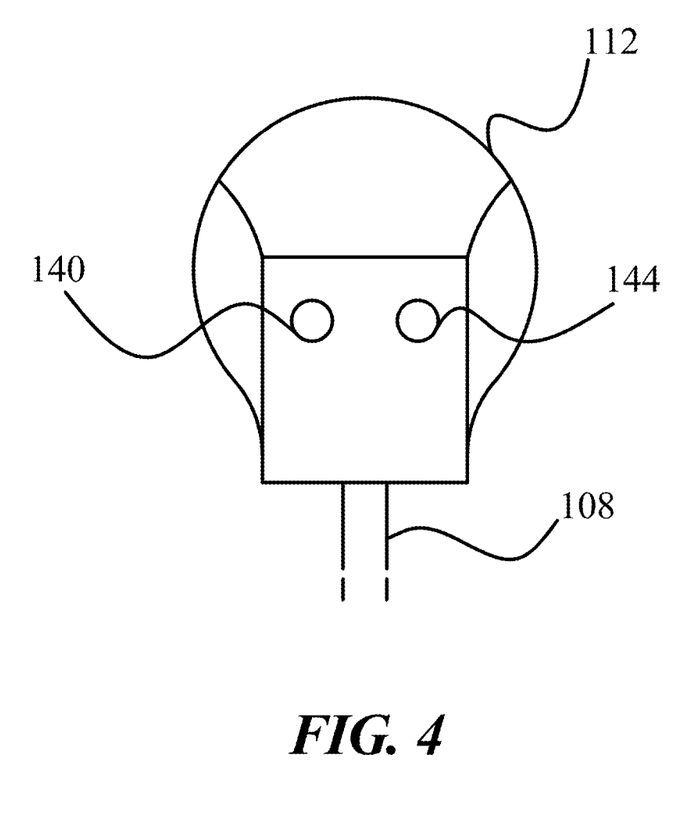
FIG. 4 is a diagram of an exemplary charging connector.

Referring now to FIG. 4, an exemplary embodiment of charging connector 112 is depicted. Charging connector 112 is electrically connected to charging cable 108. Reel toggle 140 and reel locking toggle 144 may be disposed on the surface of charging connector 112. In some embodiments, charging connector may have a handle portion on which reel toggle 140 and reel locking toggle may be disposed. In some embodiments, reel toggle 140 and reel locking toggle 144 may be disposed on charging connector 112 such that a user that is holding charging connector is able to easily reach and use reel toggle 140 and reel locking toggle 144.

Figure 5:
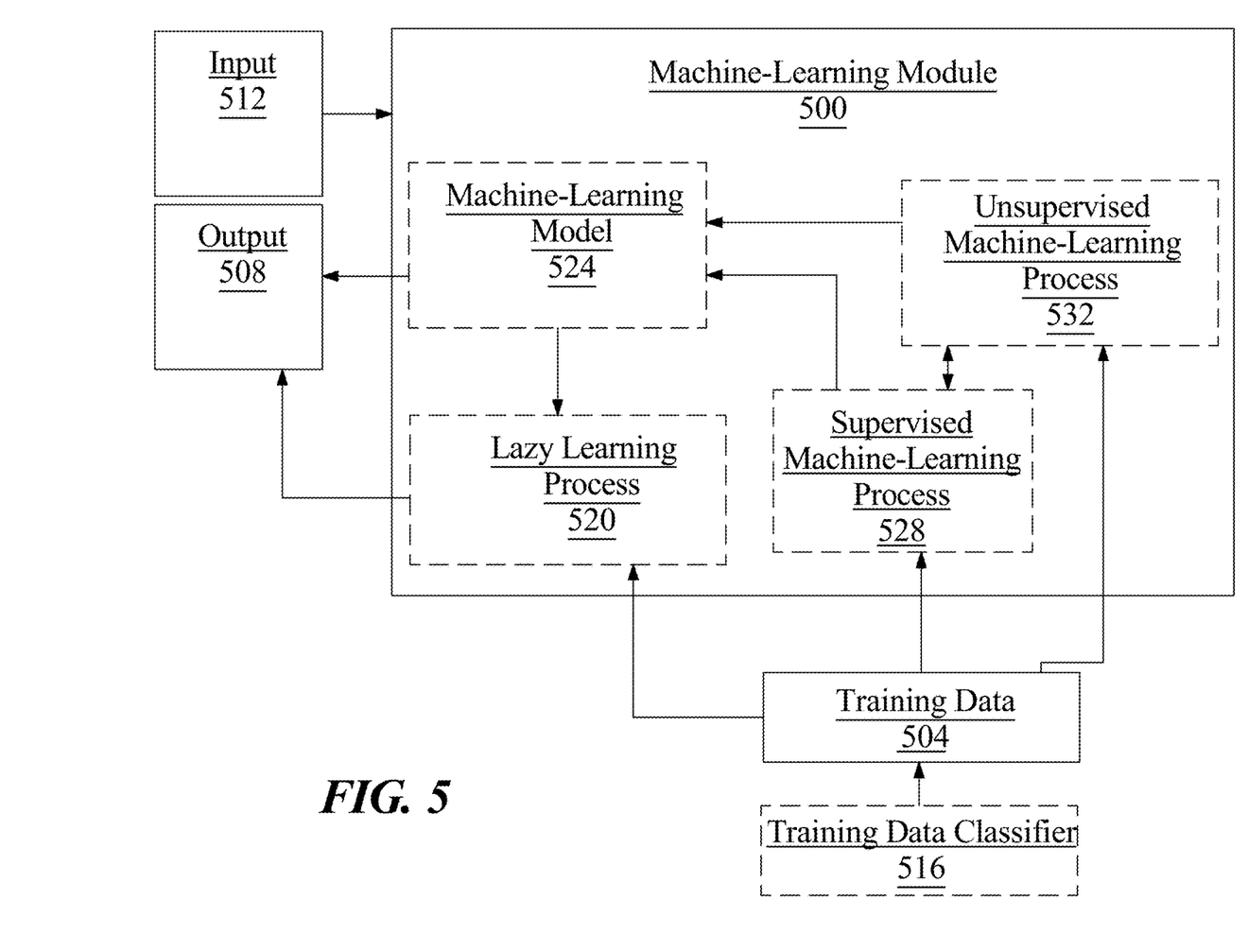
FIG. 5 is a block diagram of an exemplary machine learning model.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
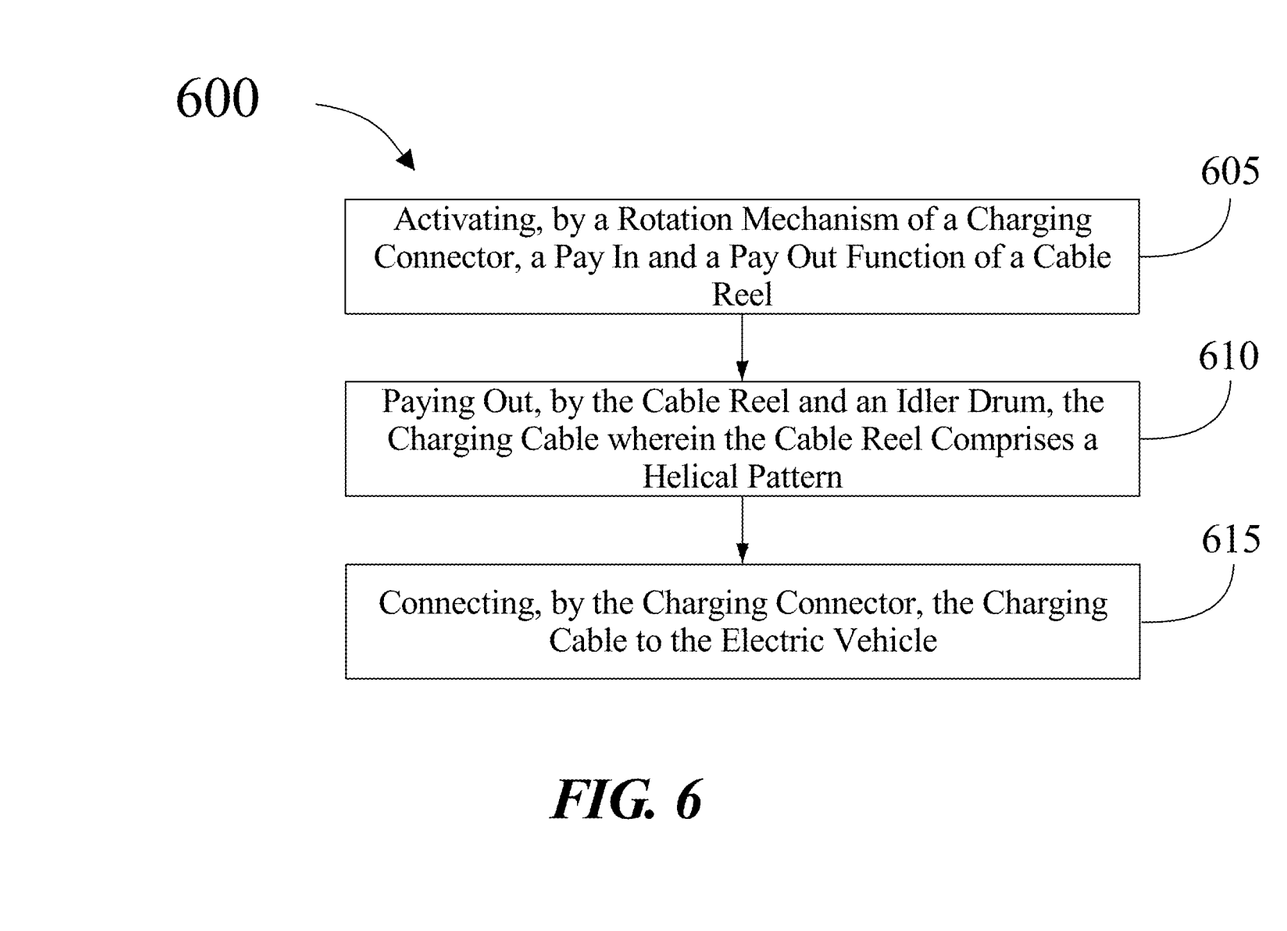
FIG. 6 is a method of use for an electric vehicle charger with a reel button for an electric vehicle.

Now referencing FIG. 6, a method 600 of use for an electric vehicle charger with a reel button for an electric vehicle is shown. Step 605 of method 600 includes activating, by an actuator of a charging connector, a rotation mechanism of a cable reel. Actuator may be mounted to a surface of a charging connector. The rotation mechanism may include an electric motor configured to rotate the cable reel. The rotation mechanism may pay in and pay out the charging cable. This step may be implemented without limitation as described in FIGS. 1-5.

Additionally, method 600 may further include providing, by a charger base, an energy source to be used by the electric vehicle charger. This step may be implemented without limitation as described in FIGS. 1-5.

Step 610 of method 600 includes paying out, by the cable reel and an idler drum, the charging cable, wherein the cable reel includes a helical pattern. The helical pattern may include a helical thread length greater than or equal to the length of the charging cable. The helical pattern may include a pitch no less than a diameter of the charging cable. Charging cable may be configured to rest in a root between each helical thread. The idler drum may be configured to produce a resultant force during the pay out, thereby pushing the charging cable away from the cable reel. This step may be implemented without limitation as described in FIGS. 1-5.

Method 600 may further include transferring heat, by the cable reel from the charging cable to an external environment. This may be due to the helical pattern on cable reel. This step may be implemented without limitation as described in FIGS. 1-5.

With continued reference to FIG. 6, method 600 includes a step 615 of connecting, by the charging connector, the charging cable to the electric vehicle. This step may be implemented without limitation as described in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
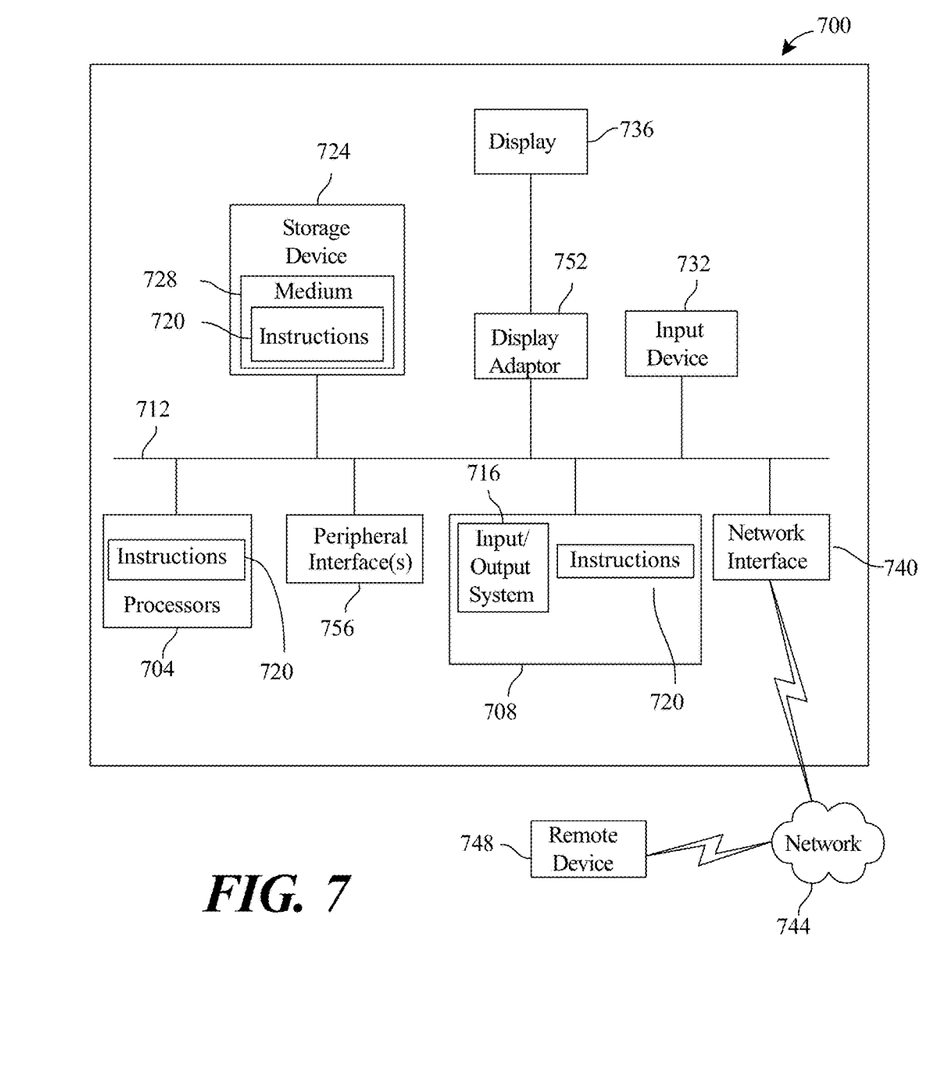
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric vehicle charger for an electric vehicle, the charger comprising:
   a charging cable;
   a charging connector mechanically connected to the charging cable, the charging connector comprising:
      a rotation mechanism configured to control a pay in and a pay out function of the electric vehicle charger;
   a cable reel comprising a helical pattern and configured to stow the charging cable; and
   an idler drum parallel to the cable reel, the idler drum configured to produce a resultant force during the pay out, thereby pushing the charging cable away from the cable reel.

2. The charger of claim 1, wherein the rotation mechanism comprises an electric motor mechanically connected to the cable reel and configured to rotate the cable reel.

3. The charger of claim 1, wherein the helical pattern comprises a helical thread length greater than or equal to the length of the charging cable.

4. The charger of claim 1, wherein the helical pattern comprises a pitch no less than a diameter of the charging cable.

5. The charger of claim 1, wherein the charging cable is configured to rest in a root between each helical thread of a plurality of helical threads.

6. The charger of claim 1, wherein the helical pattern comprises a crest configured to act as a cooling fin.

7. The charger of claim 1, further comprising a charger base comprising an energy source.

8. The charger of claim 1, wherein the cable reel is configured to transfer heat from the charging cable to an external environment.

9. The charger of claim 1, further comprising a button mounted to a surface of the charging connector configured to control the rotation mechanism.

10. A method of use for an electric vehicle charger with a reel button for an electric vehicle, the method comprising:
    activating, by a rotation mechanism of a charging connector, a pay in and a pay out function of a cable reel;
    paying out, by the cable reel and an idler drum, the charging cable wherein the cable reel comprises a helical pattern;
    providing, by the idler drum, a resultant force during the paying out, thereby pushing the charging cable away from the cable reel; and
    connecting, by the charging connector, the charging cable to the electric vehicle.

11. The method of claim 10, wherein the rotation mechanism comprises an electric motor mechanically connected to the cable reel and configured to rotate the cable reel.

12. The method of claim 10, wherein the helical pattern comprises a helical thread length greater than or equal to the length of the charging cable.

13. The method of claim 10, wherein the helical pattern comprises a pitch no less than a diameter of the charging cable.

14. The method of claim 10, wherein the charging cable is configured to rest in a root between each helical thread.

15. The method of claim 10, wherein the helical pattern comprises a crest configured to act as a cooling fin.

16. The method of claim 10, further comprising providing, by a charger base, an energy source.

17. The method of claim 10, further comprising transferring heat, by the cable reel, from the charging cable to an external environment.

18. The method of claim 10, further comprising controlling, by a button mounted to a surface of the charging connector, the rotation mechanism.

* * * * *